US010102486B1

(12) United States Patent
Kaiser et al.

(10) Patent No.: US 10,102,486 B1
(45) Date of Patent: Oct. 16, 2018

(54) IMPLEMENTING ETV WITH MULTIPLE PRESENTMENT, RESPONSE AND COMMUNICATION TECHNIQUES

(75) Inventors: David H. Kaiser, Hillsborough, CA (US); Jay C. Weber, Menlo Park, CA (US); Prasad Panchangam, Sunnyvale, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 1834 days.

(21) Appl. No.: 10/434,945

(22) Filed: May 8, 2003

Related U.S. Application Data

(60) Provisional application No. 60/379,076, filed on May 8, 2002.

(51) Int. Cl.
*G06Q 30/00* (2012.01)
*G06Q 10/06* (2012.01)

(52) U.S. Cl.
CPC .................................. *G06Q 10/06* (2013.01)

(58) Field of Classification Search
USPC .......................................................... 705/14
See application file for complete search history.

(56) References Cited

U.S. PATENT DOCUMENTS

| 6,477,504 | B1* | 11/2002 | Hamlin et al. ................... 705/10 |
| 6,810,528 | B1* | 10/2004 | Chatani ......................... 725/109 |
| 2002/0007303 | A1* | 1/2002 | Brookler et al. ............... 705/10 |
| 2002/0166123 | A1* | 11/2002 | Schrader et al. ............... 725/58 |
| 2003/0122954 | A1* | 7/2003 | Kassatly ....................... 348/335 |
| 2009/0094637 | A1* | 4/2009 | Lemmons ....................... 725/32 |
| 2012/0079369 | A1* | 3/2012 | Harris et al. .................. 715/239 |

FOREIGN PATENT DOCUMENTS

WO WO0122261 A2 * 3/2001

OTHER PUBLICATIONS

Jay Weber et al. An Enhanced Broadcast Chain Integration Protocol, 2001 NCTA Technical Papers, 2001, pp. 284-290.*

* cited by examiner

*Primary Examiner* — Alvin L Brown
(74) *Attorney, Agent, or Firm* — Tutunjian & Bitetto, P.C.

(57) ABSTRACT

A method and apparatus for presenting enhanced video at multiple presentment devices are disclosed. The video signal is received to be displayed at a variety of presentment devices. The presentment devices that are capable of displaying the video signal are identified and the video signal is transmitted to the identified presentment devices.

26 Claims, 5 Drawing Sheets

IMPLEMENTING ETV WITH MULTIPLE PRESENTMENT, RESPONSE AND COMMUNICATION TECHNIQUES

This application claims the benefit of U.S. Provisional Application Ser. No. 60/379,076, filed May 8, 2002.

FIELD OF THE INVENTION

The present invention pertains to enhanced video signal technology. More particularly, the present invention relates to providing enhancement to a plurality of presentment devices and aggregating user responses, according to user preferences, provided in response to the enhancement.

BACKGROUND OF THE INVENTION

With technological developments of today's world, our lives become more enhanced. One of such life enhancement is Enhanced Television, which allows viewers to obtain more information on a particular item displayed on the TV screen, purchase a particular item displayed on the TV screen, etc. However, these interactive features can be integrated not only into Television systems, but also into other systems to be displayed on different devices, such as cellular phones, personal digital assistants (PDAs), video game consoles, etc. For example, free beer offers may be transmitted to a variety of these devices and user responses from these devices may be received and integrated into statistical information at the free offer providers' sites.

In order for a provider of an offer to display the information at multiple presentment devices, several formats of the content may need to be created and the appropriate content transmitted separately to heterogeneous networks to be displayed on compatible presentment devices. In addition, if the provider is interested in compiling results of the responses perhaps provided via multiple types of response devices by users, where those devices may or may not be the same as the presentment devices, the provider needs to analyze and integrate responses of different formats provided by users of multiple presentment devices.

Thus, what is needed is a system and method to overcome these and other shortcomings of the prior art.

SUMMARY OF THE INVENTION

A method and apparatus for enhanced video signal operations are disclosed. The method includes receiving an enhancement to be displayed at a plurality of presentment devices. The method further comprises identifying presentment devices capable of displaying the enhancement and transmitting the enhancement to the identified presentment devices.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

It will be appreciated that the terms "video signal", "enhancement content" and "enhancement" are used interchangeably, and as used herein, mean enhanced television signal which may include synchronous and asynchronous interactive codes, control data and addresses, and additional media data, including alternate or ancillary audio and video (collectively "metadata") capable of being displayed at multiple presentment devices.

Introduction to Related Technology

Introduction to related technology may be helpful in understanding the embodiments of the invention.

One embodiment of the invention utilizes a sequenced programming signal that consists of both interstitial and programming video signal. Interstitial video content is video content, such as advertisements and/or announcements, rendered on presentment devices in between segments of programming. Generally the interstitial video content is shorter than the programming content and not the material which has attracted the user to view the programming signal. Programming video content is the media experience intended to attract the viewer and is narrative, informative, amusing, etc. Both interstitial and program video content is presented with the full range of enhanced video features including interactivity, text, animation, graphics, etc.

One embodiment of the invention utilizes "in program" enhanced video signal, which is media including interactivity that is presented while the user is viewing the program material. For example, during the program a button may appear for the user to select to obtain more information such as "More Info?" or "Jennifer's (the actor) Sweater On Sale At Macy's—Click for Details." One embodiment of the invention utilizes a Lightweight Directory Access Protocol (LDAP). LDAP is used to access a directory listing. LDAP support is being implemented in Web browsers and e-mail programs, which can query an LDAP-compliant directory.

Exemplary Architecture

Figure 1A:
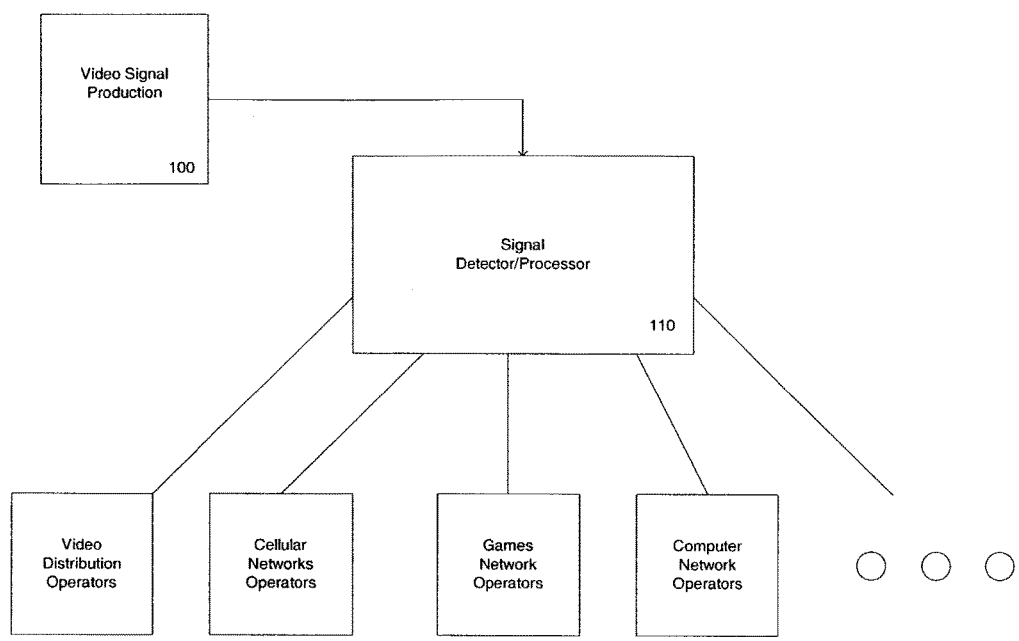
FIG. 1a illustrates a system architecture detecting metadata in a video signal according to one embodiment of the invention.

FIG. 1a illustrates an exemplary architecture according to one embodiment of the invention. Video signal is transmitted by the video signal production 100 and detected by the signal detector/processor 110. The signal detector/processor 110 transmits the processed video signal to a variety of networks, such as video distribution networks, wireless networks, games networks, computer networks, etc. In one embodiment the signal detector/processor 110 may be located anywhere where there is access to programming signals, i.e. satellite dish, and public data networks, i.e. high speed internet connection, for communication with programmers of the video signal.

Figure 1B:
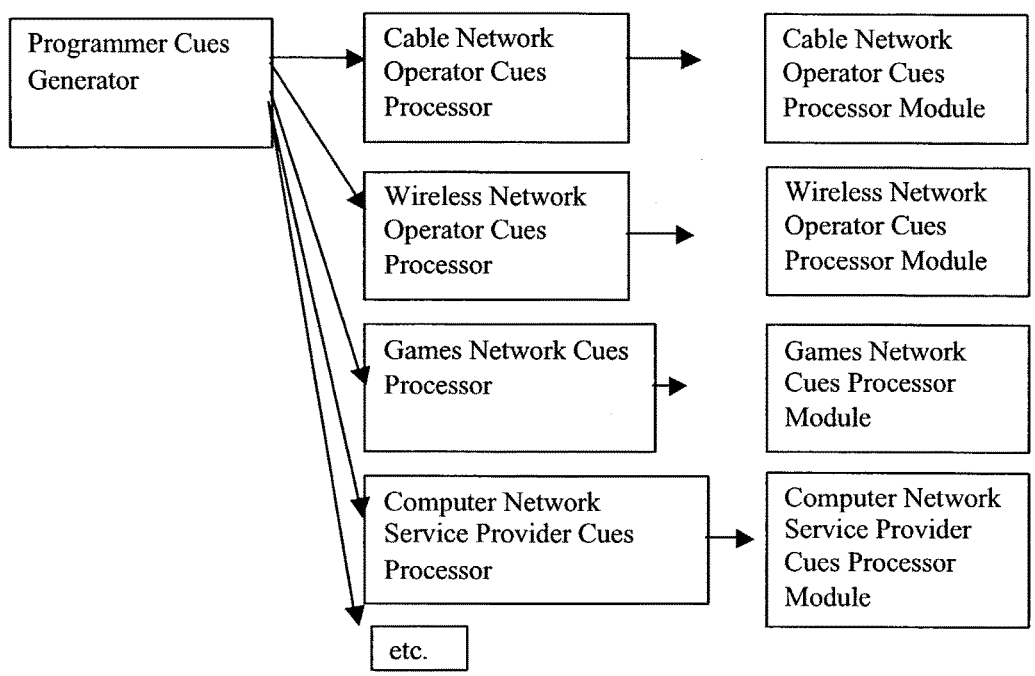
FIG. 1b illustrates a system architecture utilizing cues metadata according to one embodiment of the invention.

It will be appreciated that transmission of enhancement to a variety of presentment devices, described below, may be performed by a programmer providing cues to a variety of networks utilizing cues architecture and methodology explained in an article entitled "An Enhanced Broadcast Chain Integration," Weber, et al, The Proceedings of the NCTA, June 2001, which is incorporated by reference herein. FIG. 1b illustrates an exemplary architecture of this embodiment.

Figure 2:
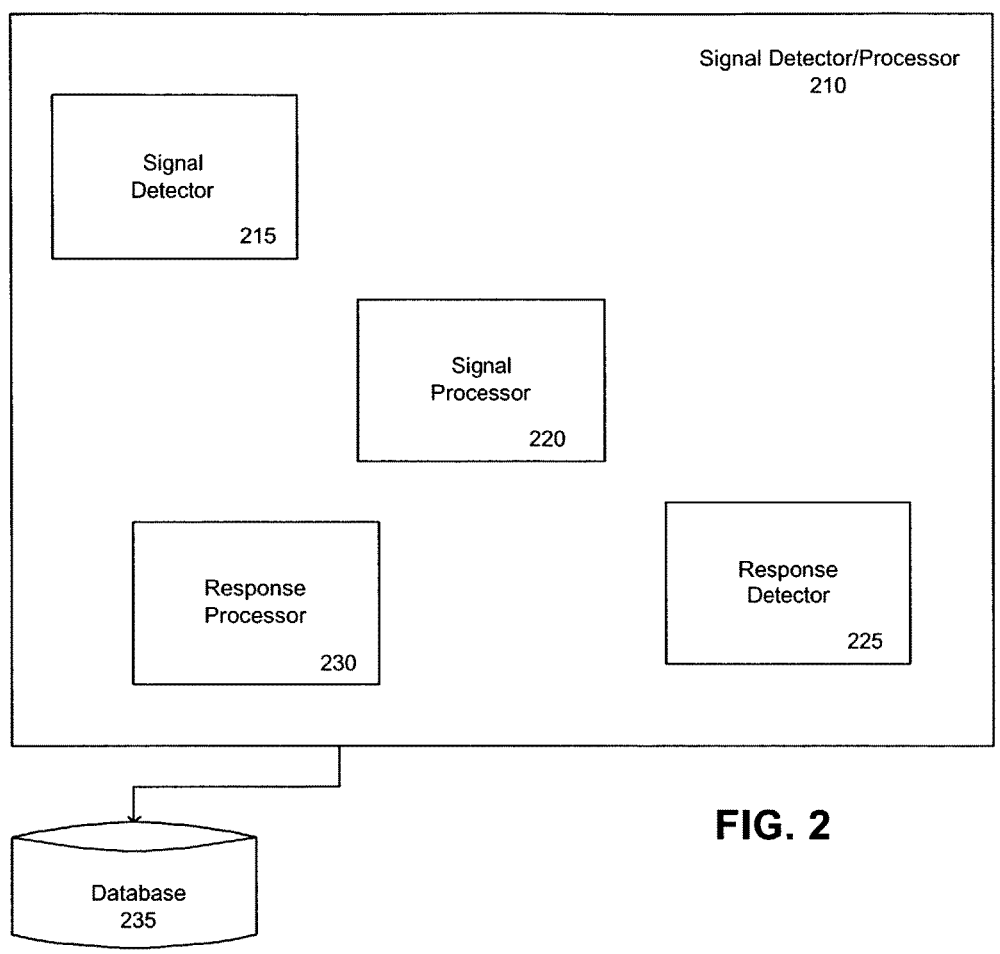
FIG. 2 illustrates components of the signal detector/processor according to one embodiment of the invention.

FIG. 2 illustrates components of the signal detector/processor 210. The signal detector/processor includes a signal detector 215 to detect a video signal transmitted by the video production. The signal processor 220 processes the detected signal according to a method described below. The response detector 225 detects the responses entered by users of devices connected to a variety of networks in response to the video signal. The response processor 230 processes the responses and transmits the result of response processing to video production according to a set of rules described below. Components of the signal detector/processor 210 may utilize a database 235 for storing data, such as data downloaded from a server, or responses data provided by presentment devices. The functions of all of theses components will be apparent from the following discussion.

Methodology

Embodiments of the invention are further described with reference to FIG. 3. At 300 the signal detector 215 detects a video signal transmitted by the video production. Upon detecting the video signal, the signal detector 215 invokes the signal processor 220, which identifies the type of enhancement at 310 to be presented at multiple presentment devices, identification of which is located in metadata of the video signal. In one embodiment the type of the enhancement may be a segment, e.g., a 30 minute show, a multi-segment video stream, an in-program video signal or an interstitial advertising video signal.

Upon detecting the type of video signal, the signal processor detects the originator of the signal, identification of which is embedded in the metadata of the video signal, along with originator related information, such as rules and procedures of the originator. In one embodiment the originator information may includes identification of a copyright owner, digital rights management company, video production company, programmer and/or distribution company, etc. For example, the originator field of the metadata may include Columbia TriStar Films to identify copyright owner originating the video signal. The originator field may include National Broadcasting Company (NBC) to identify a programmer originating the video signal. Moreover, the originator information may include network address of originators' rules and procedures which apply to the signal, for example CBS may want to know a number of user responses to video enhancement viewed through CBS's local San Francisco affiliate, KTVU. It will be appreciated that not all of these fields need to be present in the originator data and some of the fields may have null values. It will be also appreciated that numerous other originators of video signal may be included in the originator field of the metadata and the invention is not limited to the examples presented above.

Upon identifying the originator of the video signal, the signal processor at 330 determines video enhancement identification number, which is a unique number assigned by the originator to the enhancement. At 340 the signal processor determines types of devices that are capable of displaying the enhancement, i.e. presentment devices. The presentment devices may include a television device, an HDTV device, a cellular phone, a computer display, a personal digital assistant (PDA), a game console, a remote control with an embedded video screen, etc. Along with the identification of the type of the presentment device, the metadata may specify characteristics of the presentment devices that are capable of displaying the enhancement, such as a version of software on the presentment device, manufacturer of the device, memory capability of the settop box, etc. Each identification of a presentment device is associated with an address at a server at which the enhancement, formatted for the particular presentment device, is located. The following table includes attributes and values that identify exemplary presentment devices and location's of the video signal:

| | |
|---|---|
| NTSC, PAL, SECAM TV environment device, such as set top box, built-in set top box, Personal Video Recorder (PVR), etc. | Address of enhancement for a device, such as Scientific Atlanta 8000 PVR with PowerTV 1.5 operating system, digital cable set top box Motorola DCT 2000 with WINK enhancement system, etc. |
| High Definition Television (HDTV) | Address of the enhancement for an HDTV system. |
| Cellular Phones | Address of the enhancement for Kyocera with Palm operating system, Nokia cellular phones with native operating system, 2 line text LCD without an operating system, etc. |
| Computer Display | Address of the enhancement for a computer system |
| Personal Digital Assistant (PDA) | Address of the enhancement for a PDA with Palm operating system, for a PDA with Windows CE, etc. |
| Game Console | Address of the enhancement for PlayStation, Xbox, Gameboy, etc. |
| Remote control | Address of the enhancement for a remote control capable of receiving signals and notifying users. |

In one embodiment the metadata of the video signal includes information about all the presentment devices that are capable of processing the current video signal. In another embodiment of the invention, the metadata of the video signal may contain an address at a server, accessible by the signal detector/processor, where information about presentment devices that are capable to process the enhancement, along with addresses of location of the actual content formatted for the particular presentment device is located. In one embodiment a Lightweight Directory Access Protocol (LDAP) compliant server may be utilized to obtain additional information about characteristics of presentment devices. Thus, the signal processor may construct from information in the metadata a list of all presentment devices which can potentially display the enhancement.

Upon determining the type of presentment devices that are capable of processing the current enhancement, the signal processor transmits a message to networks to which the identified presentment devices are connected. For example, if the current enhancement can be processed by a cellular phone, the signal processor transmits the information needed by the cellular network to present the enhancement formatted for a cellular phone. The cellular network, such as AT&T Wireless, may have a prior business relationship with the originator of the enhancement, or such a business arrangement can be entered into dynamically based on dynamic business rules available in the metadata. For example, if the is no pre-existing business relationship between the network operators and the originator of the enhancement, business rules embedded in the metadata may be analyzed by the network operators to determine conditions of the dynamic relationship, for example the specified cost of presenting the enhancement and receiving a user response is acceptable to the network operators. If it is acceptable, the network presents the enhancement to the devices connected to the network. If it is not acceptable, the enhancement rejected for presentment by the network operators.

In one embodiment of the invention, prior to transmitting the video signal to networks of presentment devices, the signal processor determines whether a particular presentment device is able to provide a response the current video signal requires. For example, if the enhanced content is a pizza commercial prompting the user to order pizza for delivery within the next forty minutes, the signal processor determines that even though a Motorola DCT 2000 with Wink system software for presentment and response collection can display the pizza commercial, it is not able to return the response within a satisfactory time because Wink settop boxes accumulate response information over a period of time and return the responses over "store and forward" network architecture that operates with a latency which is unsatisfactory to pizza merchants. Thus, if the enhancement, e.g., a pizza commercial along with an "Order Now" button, requires dynamic response, which may be specified in metadata of the signal in a response type field, the signal processor identifies presentment response devices and architectures that are not capable of processing dynamic enhancements. It will be appreciated that other types of responses may be identified in the response type field and the present invention is not limited to identification of presentment devices that are capable of processing dynamic responses.

In one embodiment, the signal processor transmits the enhancement information to networks of presentment devices without determining whether the presentment devices are able to provide a response to the enhancement as required by the enhancement originator. The signal processor along with the enhancement information transmits identification of the required response directing the networks of presentment devices to determine which presentment devices connected to the network are capable of providing the required response and, thus will be provided with the enhancement, and which presentment devices will not be provided with the video signal due to inability to provide the required response. For example, if only some presentment devices are "store and forward" settop boxes connected to the network and other presentment device are capable of providing a dynamic response to the enhancement, then the signal processor transmits the enhancement information and identification of the response requirements to the network for further identification of presentment devices to receive the enhancement.

Upon receiving the enhancement information, the individual networks transmit the enhanced content to presentment devices connected to the network, for example, AT&T wireless network transmits the appropriate content to the cellular phones connected to its cellular network and capable of displaying the content. In one embodiment of the invention, the networks display the enhancement information at the presentment devices according to a set of business rules that may be included in the metadata. Alternatively, the metadata may include an address of a business rules location, the address is accessible by network operators. The business rules may specify, for example, cost of viewing the enhancement based on demographic information for a user. Thus, if users of presentment devices need to subscribe to network services, the network operators may include demographic information of each user-subscriber. For example, if an enhancement is an advertisement of a new Porsche car model, the business rules may specify costs for viewing and submitting of user response based on annual income of each user-subscriber. The table below provides examples of business rules for this scenario:

| Income range | Location of the enhancement | Cost per display of offer on a presentment device | Cost per submission of user's response |
| --- | --- | --- | --- |
| Not available | . . . porsche/ad1/NTSC/default | $0.0 | $0.25 |
| $0-$20,000 | No enhancement to be displayed | NA | NA |
| $20,001-$100,000 | . . . porsche/ad1/NTSC/notTarget | $0.00 | $1.00 |
| $100,001-unlimited | . . . porsche/ad1/NTSC/Target | $1.00 | $50.00 |

Prior to processing the enhancement utilizing the specified business rules, the network operators may determine whether privacy policy of network services, to which users of the network are subscribed, allows the network to process the enhancement according to the specified rules. For example, if private policy of AT&T wireless network services includes a provision that prohibits release of any information pertaining to subscribers' annual income to third parties, the AT&T wireless network will not process the enhancement for presentment to cellular phones of users-subscribers or may display a default enhancement that is provided by the enhancement originator for situations where networks are not able to process the enhancement according to a specified set of business rules.

Figure 4:
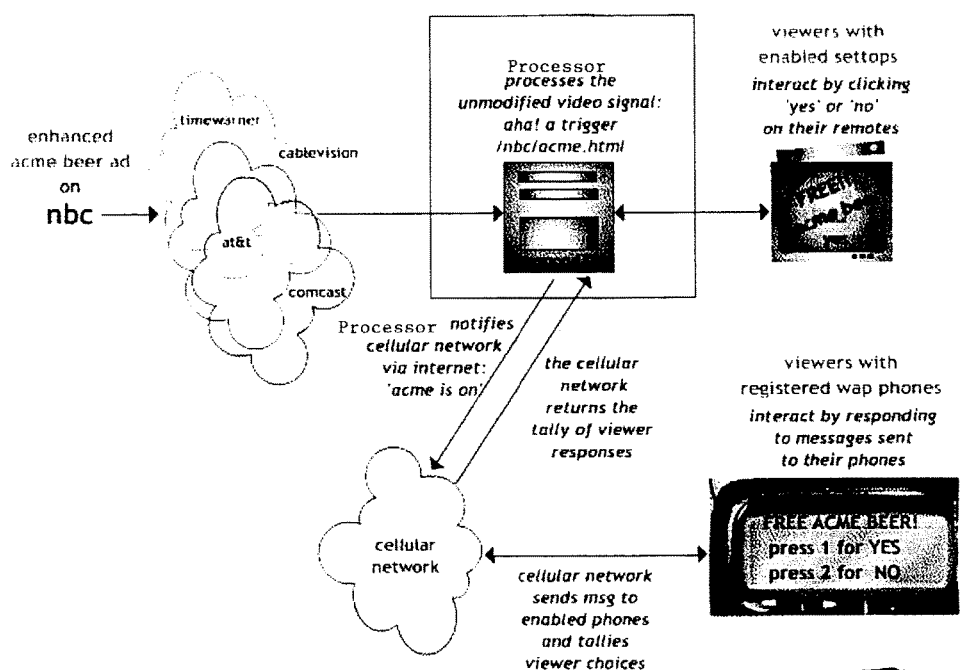
FIG. 4 illustrates the process of presenting enhancements to multiple presentment devices according to one embodiment of the invention.

Once the responses are entered by the users in response to the enhancement displayed at the presentment devices, the networks process and forward the responses to the signal detector/processor host. Upon receipt of information from the networks, the signal detector/processor invokes the response detector to aggregate results and effect fulfillment by forwarding the results to the proper party, typically the originator of the video signal or an advertiser of the content of the video signal. Results may be forwarded to others, for example total number of responses to a variety of advertisements provided by a single operator might be forwarded to the operator. FIG. 4 illustrates the above described method.

Figure 3:
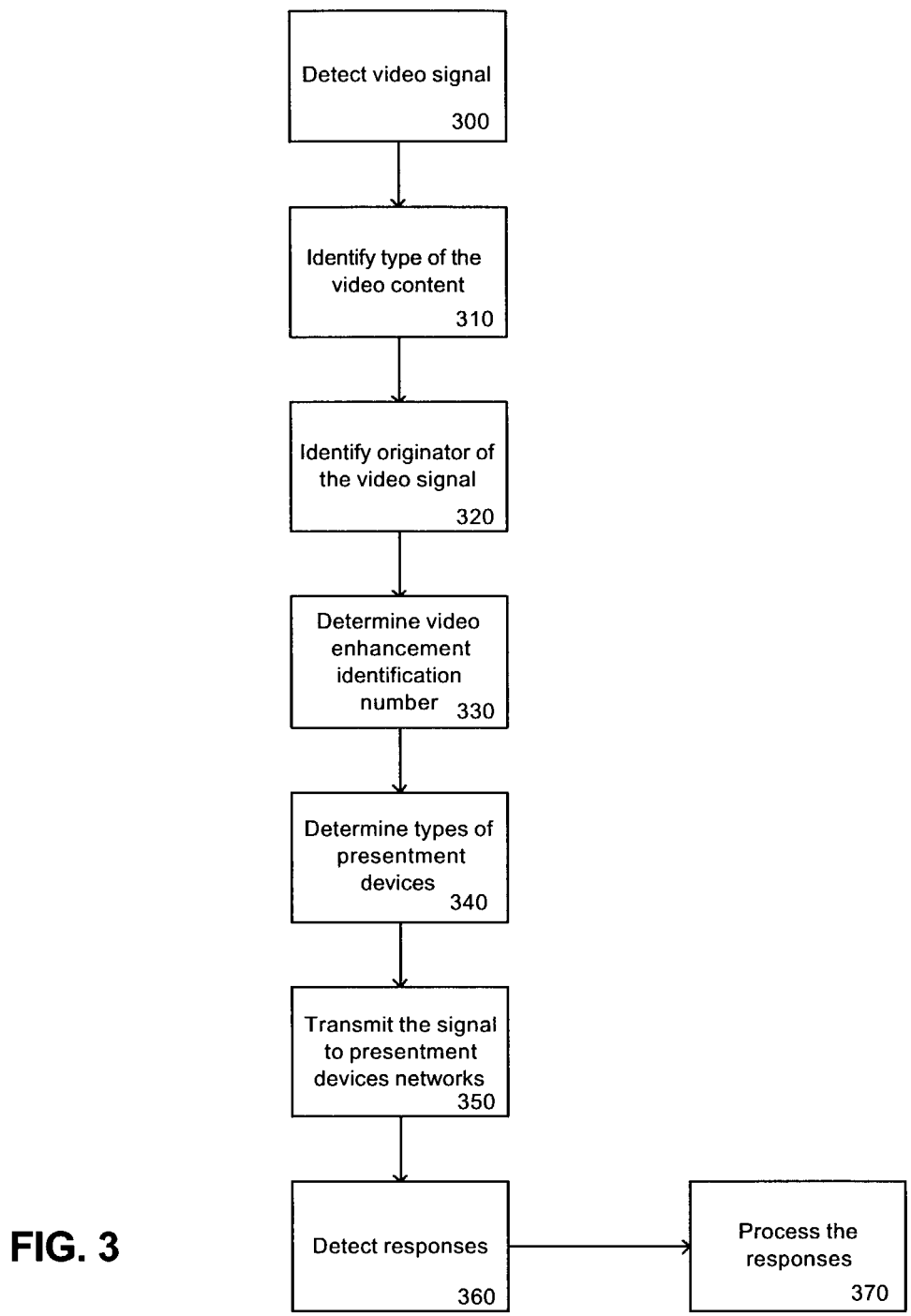
FIG. 3 is a flow diagram of a process of presenting enhancements to multiple presentment devices according to one embodiment of the invention.

In one embodiment of the invention, upon the response detector detecting the responses transmitted by multiple networks, the response processor aggregates and processes the responses at 370 of FIG. 3 utilizing a set of business rules provided by the video signal originator. As stated above, the set of business rules may be included in the business rules field of the metadata or the metadata may include an address of the business rules location at a server accessible by the response detector. For example, the business rules field may specify the address at a server where the set of business rules is located. In addition, the business rules field may include semantics to value demographic divisions, user characteristics, etc., to be used by the response processor when compiling response results. The business rules field may also include an address at a server where the results of the response processing should be placed by the response processor. The business rules field may also include an address to send the response processing results for further processing by the originator.

In one embodiment of the invention, the set of business rules may be supplied to the signal detector/processor host during set up of business relations with the video signal originator. It will be appreciated that a variety of business rules may be utilized to process the responses and the present invention is not limited to examples provided above.

In one embodiment once the responses are aggregated and processed according to the set of business rules, the results are transmitted to the originator of the enhancement. The originator may utilize the results to dynamically modify the video signal to be displayed at the presentment devices. For example, if the original enhancement required as a response a selection of a hockey team that a user thinks will win a current game, the follow up video signal may display percentages of users who believe a particular team will win the game and/or a number of other viewers with the same response to the initial enhancement.

It will be recognized that many of the features and techniques described above may be implemented in software. For example, the described operations may be carried out in a processing system or other suitable device in response to its processor(s) executing sequences of instructions contained in memory of the device. The instructions may be executed from a memory such as RAM and may be loaded from a persistent store, such as a mass storage device, and/or from one or more other remote processing systems. Likewise, hardwired circuitry may be used in place of software, or in combination with software, to implement the features described herein. Thus, the present invention is not limited to any specific combination of hardware circuitry and software, nor to any particular source of software executed by the processing systems.

Thus, a method and apparatus for providing enhanced television signal to multiple presentment devices have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of transmitting an enhanced television signal to different types of devices by a transmitting device that has a processor, the method comprising:
   receiving an enhancement associated with video information of sequenced programming and a programming video signal composed of said video information to be displayed at a first plurality of a first type of presentment device and at a second plurality of a second type of presentment device, wherein said first plurality and second plurality are device types which are different from each other;
   having a processor of a transmitting device identify that said first plurality of said first type of a presentment device and said plurality of said second type of a presentment device are capable of displaying the enhancement and said programming video signal based on metadata contained within the enhanced television signal;
   having said processor of a transmitting device determine whether said first plurality of said first type of presentment device and said plurality of said second type of presentment device are capable of sending a response to said enhancement; and
   having said transmitting device processor transmit the enhancement and said programming video signal to the plurality of device types from said first and second device types which are identified as capable of displaying the enhancement, providing said response to said enhancement, and displaying said programming video signal when the respective type of device is capable of displaying such an enhanced television signal and said programming video signal.

2. The method of claim 1, wherein the receiving the enhanced television signal includes detecting the enhanced television signal to be displayed at the pluralities of presentment devices.

3. The method of claim 1, wherein the identifying pluralities of presentment devices comprises transmitting cues identifying enhancement cues.

4. The method of claim 1, wherein the enhanced television signal is an advertisement.

5. The method of claim 1, wherein the enhanced television signal is a graphical representation of information available for viewing.

6. The method of claim 1, wherein one of the plurality of the presentment device types include cellular phones.

7. The method of claim 1, wherein one of the plurality of the presentment device types include personal digital assistants.

8. The method of claim 1, wherein one of the plurality of the presentment device types include video game consoles.

9. The method of claim 1, wherein one of the plurality of the presentment device types include televisions.

10. The method of claim 1, further comprising aggregating responses to the enhanced television signal provided by the users of the presentment devices.

11. The method of claim 1, further comprising presenting the aggregated responses to an originator of the enhanced television signal.

12. The method of claim 10, wherein the aggregating the responses comprises aggregating the response based on a set of business rules where said business rules include information affecting a cost charged to an enhancement originator for a user to view said enhanced television signal.

13. The method of claim 12, wherein the set of business rules is presented in a metadata associated with the enhanced television signal.

14. The method of claim 12, wherein the set of business rules is located at an address specified in a metadata associated with the enhancement.

15. The method of claim 1, further comprising displaying the enhanced television signal at the presentment devices if a set of business rules is acceptable to a network operator with no pre-existing business relationship with an enhancement originator.

16. The method of claim 1, wherein additional metadata comprises identification of an originator of the enhanced television signal.

17. The method of claim 16, wherein the additional metadata comprises procedures of the originator.

18. The method of claim 16, wherein the originator is a programmer originating the enhanced television signal.

19. The method of claim 16, wherein the originator is a copyright owner of the enhanced television signal.

20. The method of claim 1, wherein the metadata includes an identification of an address at a server at which identification of presentment devices capable of presenting the enhanced television signal is located.

21. The method of claim 1, wherein the identifying the first plurality of presentment devices capable of displaying the enhanced television signal comprises identifying the first plurality of presentment devices based on responses from the first plurality of presentment devices.

22. The method of claim 21, wherein the presentment devices includes store and forward presentment devices.

23. The method of claim 21, wherein the enhancement is not presented to presentment devices that are not able to provide a response specified in a set of business rules.

24. The method of claim 21, wherein the response specified in the set of business rules is a dynamic response.

25. The method of claim 1, wherein the transmitting the enhanced television signal to the pluralities of presentment devices is performed via a plurality of networks servicing the pluralities of presentment devices.

26. The method of claim 1, wherein said identification additionally determines whether said first presentment device and said second presentment device can provide a dynamic response said enhancement requires; and where said transmitting step has said enhancement transmitted to said first and second device types when such device types are identified as additionally being capable of providing said dynamic response said enhancement requires.

\* \* \* \* \*